United States Patent [19]
Orloff et al.

[11] 4,420,976
[45] Dec. 20, 1983

[54] MULTIPLEXED TRUE MASS GAGING SYSTEM

[75] Inventors: Eugene F. Orloff, Long Beach, Calif.; Martin Horowitz, Lynbrook; Charles H. Ritter, Great River, both of N.Y.

[73] Assignees: McDonnell Douglas Corporation, Long Beach, Calif.; Gull Airborne Instruments, Inc., Smithtown, N.Y.

[21] Appl. No.: 300,570

[22] Filed: Sep. 9, 1981

[51] Int. Cl.³ ............................................. G01F 23/26
[52] U.S. Cl. .................................................... 73/304 C
[58] Field of Search ....................................... 73/304 C

[56] References Cited
U.S. PATENT DOCUMENTS

| | | |
|---|---|---|
| 2,697,348 | 12/1954 | Bevins . |
| 3,248,650 | 4/1966 | Bailkowski . |
| 3,626,398 | 12/1971 | Owens, Jr. . |
| 3,665,439 | 5/1972 | Brummer . |
| 3,801,902 | 4/1974 | Horowitz . |
| 3,830,090 | 8/1974 | Hersch et al. . |
| 3,906,437 | 9/1975 | Brandwein . |
| 4,007,627 | 2/1977 | Stansfield . |
| 4,080,562 | 3/1978 | Rubel et al. . |
| 4,147,050 | 4/1979 | Rubel et al. . |
| 4,258,422 | 3/1981 | Dougherty . |
| 4,262,531 | 4/1981 | Hewitt et al. ............. 73/304 C |

*Primary Examiner*—S. Clement Swisher
*Attorney, Agent, or Firm*—Henry M. Bissell; George W. Finch; Donald L. Royer

[57] ABSTRACT

A standardized, modular, fuel quantity gaging system suitable for use with aircraft having a plurality of fuel tanks. The system utilizes a standard electronic module, preferably located on the front spar of the center wing box, to house a redundant, centralized, microprocessor-based electronic assembly. This assembly processes the tank-generated fuel quantity signals and produces a digital data stream which is distributed to display units in the cockpit and at the refueling control panel. The digital signals are transmitted over two 2-wire data busses from the standard electronic module to the cockpit and to the refueling panel. One of these buses is active, the other being held in standby, for use as needed. The two busses are part of separate data processing channels extending between the fuel quantity signal multiplexers in the standard electronic module and the indicators in the cockpit and at the refueling panel. The indicators are basically display only units which receive, decode and display the digital fuel quantity information as it appears on the active data bus. This arrangement permits a high degree of interchangeable modularity among its various components, leading to minimized maintenance and spares provisioning cost. Components can be replaced without any need for recalibration or adjustment of any kind. The system includes equipment for detecting and indicating faults, thus providing improved reliability.

34 Claims, 5 Drawing Figures

MULTIPLEXED TRUE MASS GAGING SYSTEM

BACKGROUND OF THE INVENTION

1. Field of the Invention

This invention relates to fuel gaging systems, and is particularly applicable to aircraft having a plurality of fuel tanks.

2. Description of the Prior Art

Known prior art gaging systems employed in currently operating aircraft typically employ a plurality of probes in each of the separate fuel tanks to develop signals indicating the volume of fuel in each tank. These probes comprise capacitors which are connected so that their admittance varies linearly as an analog function of quantity of fuel in the tank. One example of a typical bridge-type capacitance probe and gaging system may be found in U.S. Pat. No. 2,638,000 of Sontheimer. A compensating capacitor, totally submerged in the fuel, provides another analog indication that varies with the density of the fuel. These signals are sometimes directed to master indicators in the cockpit panel which include various circuitry to convert the analog signals to digital outputs which drive displays. Signals from this circuitry are also sometimes directed to repeater displays in the refueling panel. One such system, developed for an aircraft with three fuel tanks, is described in detail in U.S. Pat. No. 3,830,090 of Hersch et al. Related systems for measuring the capacitance of fuel tank probes and for testing the accuracy of the system by comparison to known reference signals are disclosed in Horowitz U.S. Pat. No. 3,801,902 and in Rubel et al U.S. Pat. Nos. 4,080,562 and 4,147,050. The disclosures of those patents are incorporated here by reference as though set forth in full herein. The Rubel et al system uses triangular wave test signals for improved accuracy and increased immunity to spurious coupling and line loading variations.

Other fuel gaging systems for aircraft are known in the prior art; for example, U.S. Pat. No. 2,697,348 of Bevins discloses such a system which totalizes the fuel consumption of a plurality of engines and provides a display indication of the remaining fuel in the tanks. Doughety et al. U.S. Pat. No. 4,258,422 discloses another fuel gaging and totalizing system.

The problem of adequately displaying the considerable amount of information relating to the condition and operation of an aircraft in a manner which can be readily monitored and assimilated by the pilot is recognized in U.S. Pat. No. 3,665,439 of Brummer et al. and U.S. Pat. No. 3,906,437 of Brandwein et al. Brummer et al disclose a supervision system for aircraft which utilizes multiplexing of signal information over a signal transmission link between measuring devices and cockpit display units. The system of Brandwein et al. involves rather intricate analog signal measurement and conditioning with further incrementing and application to an analog display and the additional provision of a selector switch for applying particular signals to an analog-to-digital converter and an associated digital display. An objective of the system is to develop an alarm in the event of deviation of measured signal conditions from some norm or threshold reference level. Owens, Jr. et al. in U.S. Pat. No. 3,626,398 similarly disclose a multiple display system for aircraft, simultaneously displaying data corresponding to present condition values and data corresponding to deviation of those conditions from a preset reference. A multiplexing signal processing system with cathode ray tube display is disclosed in U.S. Pat. No. 3,248,650 of Bialkowski et al.

With all of the effort that has been directed to providing simplified and accurate display of aircraft operating conditions to the pilots, problems still remain. This is particularly true in the case of fuel gaging systems in commercial aircraft in which fuel quantity information is derived from a plurality of fuel tanks and displayed to the pilot in terms of total fuel and individual fuel tank quantities. It is clear that inherent inaccuracies in present gaging systems place limits on effective fuel capacities with resultant burdens on operating economy, aircraft range and the like.

The problem has become more severe in recent years with increased variation of fuel properties. Present gaging systems depend for accuracy on precise control of the density of the fuel stored. Because of the variation in quality control in the fuels provided in some airports and because of fuels being refined from new sources of crude oil, there is a much greater variation encountered in the fuel density. The typical variation leads to a three or four percent error in fuel quantity measurement. The DC 10 airliner, for example, carries 240,000 pounds of fuel; thus maintaining a reasonable reserve requires carrying at least 10,000 pounds as unused dead weight.

The errors in capacitance measurement of fuel quantity resulting from the variation in fuel density which is encountered may be reduced by the use of densitometer devices. A number of liquid densitometers are known in the prior art, as exemplified by U.S. Pat. Nos. 2,934,476 of Bernstein, 4,007,627 of Stansfeld, and 4,256,403 of Powell. Such densitometers have not as yet been incorporated in known fuel gaging systems for aircraft. However, the need for densitometers in fuel quantity measurement systems has become more critical with the above-noted increased variation in fuel density in order to improve the accuracy of the measurements.

SUMMARY OF THE INVENTION

In brief, arrangements in accordance with the present invention comprise a plurality of signal generating units, or probes, and densitometers mounted in individual fuel tanks for providing signals indicative of the volume and density of the fuel in the respective tanks. Integrated display units are mounted in the cockpit and on the refueling panel for providing readouts of fuel quantity, in kilograms or pounds, in the respective tanks. A signal processing system is coupled between the tank probes and the displays for generating the display readouts in accordance with the tank signals. This signal processing system provides duplication of components in dual channels (for redundancy) over most of the signal path and includes a standard electronic module, mounted near the central connections to the fuel tank probes and containing appropriate signal conversion, processing and multiplexing stages in duplicate, dual data busses extending from the standard electronic module to the cockpit and refueling panels respectively, and dual-channel signal-receiving and -processing stages at the cockpit panel as well as dual-channel signal-receiving capability at the refueling panel.

The fuel tank probes generally correspond to the in-tank elements disclosed in the above-referenced Hersch et al and related patents, namely a plurality of factory-adjusted level-measuring capacitors for developing signals indicative of fuel volume, with associated compensating capacitors for developing signals corresponding to fuel density. In addition, each tank preferably contains a densitometer for measuring fuel density with greater precision. The densitometer enables the system to provide gage readings in terms of true fuel mass. In its preferred embodiment, the densitometer operates on the principle of a vibrating cylinder for direct determination of fuel density. The cylinder forms the vibrating element of an extremely stable mechanical resonating system. It is maintained in oscillation at its natural resonant frequency by a magnetic pick-up and feedback system. The frequency of oscillation is a function of the elasticity, stiffness and effective mass of the vibrating element. Densitometer design ensures that the elasticity and stiffness remain constant over the operating range and for all operating conditions. The densitometer sensor element is positioned near the low point in the fuel tank so that the hollow cylinder is filled with fuel. Since the element is in intimate contact with the fuel to be measured, its effective mass is a function of the element mass plus that of the fuel. The fuel density can therefore be determined from the resultant resonant frequency. A suitable densitometer for use in arrangements of the present invention is described in the above-cited Stansfeld patent, incorporated herein by reference. An important aspect of this densitometer is its immunity to small contaminant particles in the fuel by virtue of the fact that its magnetic pickup and drive components are in a hermetically sealed cavity. The densitometer measures fuel density directly rather than deriving it indirectly by measurement of other fuel parameters, as is the case with the tank compensators. The structural details of the fuel tank probes, compensating capacitors and densitometers are not a part of the present invention, but they are included in the overall system of the invention.

In the preferred embodiment of the present invention, each signal channel within the standard electronic module includes a multiplexer coupled to receive signals derived from the probes and compensator in each tank and to apply these signals in multiplexed form to an A/D (analog-to-digital) converter which in turn provides a digitized output to a microprocessor. The microprocessor applies a data stream, corresponding to the digitized signal, to signal busses leading respectively to the cockpit panel and to the refuel panel. Each data bus is a single shielded, twisted pair of conductors. In the display units, each signal path includes a data receiver coupled to the incoming data bus for providing an output to a demultiplexer which supplies demultiplexed signals to display drivers and associated signal combining stages. Since the need for failure protection is less critical in the refuel panel, only a single demultiplexer stage is provided, coupled to receive signals from either one of the data busses and to direct demultiplexed signals to the driver stages for the displays in the refuel panel. Each of the separate components or LRUs, the central standard electronic module (SEM), the cockpit display unit (CDU) and the refuel panel load select and display unit (LSDU), has its own power supply for providing DC power at appropriate levels as derived from the central aircraft system. In the case of the cockpit display unit and the standard electronic module, duplicate individual power supplies are provided as part of the dual-channel redundancy to protect against failure, with selection of the power supplies being controlled from the cockpit.

In addition to the dual-channel equipment already described, the standard electronic module contains individual oscillators, one for each tank, for driving the fuel tank probes and compensating capacitors and, in addition, AC-to-DC signal converters, one for each tank, for receiving the tank signals and converting them to a form suitable for application to the multiplexers which are the input stages of the respective redundant signal processing channels.

The microprocessor in the standard electronic module is of standard construction and is programmed to compute fuel quantity in digital format and to transmit corresponding information to the display units. The fuel quantity information includes signals indicating fuel quantity in each individual tank as well as the total fuel quantity in all tanks. The microprocessor automatically and continuously monitors all functions in the standard electronic module and activates various caution indications at the cockpit display unit upon detection of a malfunction. Initial indication of the general type of malfunction is provided by causing an individual tank display to read "9999" in the event of a tank fault and to go blank in the event of a circuit fault. Also, the least significant active digit will go blank when densitometer failure is detected by the SEM. The system is provided with suitable switches at the cockpit panel for permitting self-test of the system. Thus the flight crew can exercise the system by pressing a self-test button. It can also verify the integrity of every digit-segment of the displays. Manually operated switches located at the cockpit display unit also permit the flight crew to select between the dual channels to determine which will be active and which will be standby as well as to test each channel independently.

Significant advantages are realized from the use of arrangements in accordance with the present invention. For example, the fuel gage system of the above-referenced Hersch et al patent requires a coaxial cable and two unshielded cables for each probe in the individual fuel tanks. Such cables are required to extend from the respective tanks to the master digital indicators at the cockpit panel. The location of the standard electronic module of the present invention in a centralized location adjacent the wing results in the elimination of most of the coaxial cables required in the existing systems, with a substantial savings in weight ranging to over 100 pounds, depending upon the aircraft involved. Moreover, some of the existing systems require recalibration of the system every time a component is replaced. In contrast, the standardized modular arrangement of the present invention completely eliminates any need for adjustment or calibration of components after the system is installed or after a component is replaced.

Tank interface modules are provided which are tailored to the individual probes of particular tanks. The tank interface modules consist of two assemblies. One is universal for all tanks. The other is a sub-assembly which plugs into the universal assembly. The sub-assembly has specific tank-dedicated components and "tailors" the interface module to a particular tank. The standard electronic module is of modular design and also includes basic processor modules which are usable with a variety of aircraft with only a change in a PROM (Programmable Read Only Memory) program to tailor it to a particular aircraft. Thus, in any given application the standard electronic module comprises both universal and dedicated modules, the dedicated ones being for tank-interface purposes. Additional savings are realized by the further standardization of hardware and installation procedures, as well as in the permissible simplification and improvement of wing structure by virtue of the adoption of internally mounted probes within the wing tanks. Finally, the system achieves a manyfold improvement in reliability with a corresponding reduction in downtime and cost of maintenance, compared with existing prior art systems.

BRIEF DESCRIPTION OF THE DRAWINGS

A better understanding of the present invention may be had from a consideration of the following detailed description, taken in conjunction with the accompanying drawings in which.

DESCRIPTION OF THE PREFERRED EMBODIMENT

Figure 1:
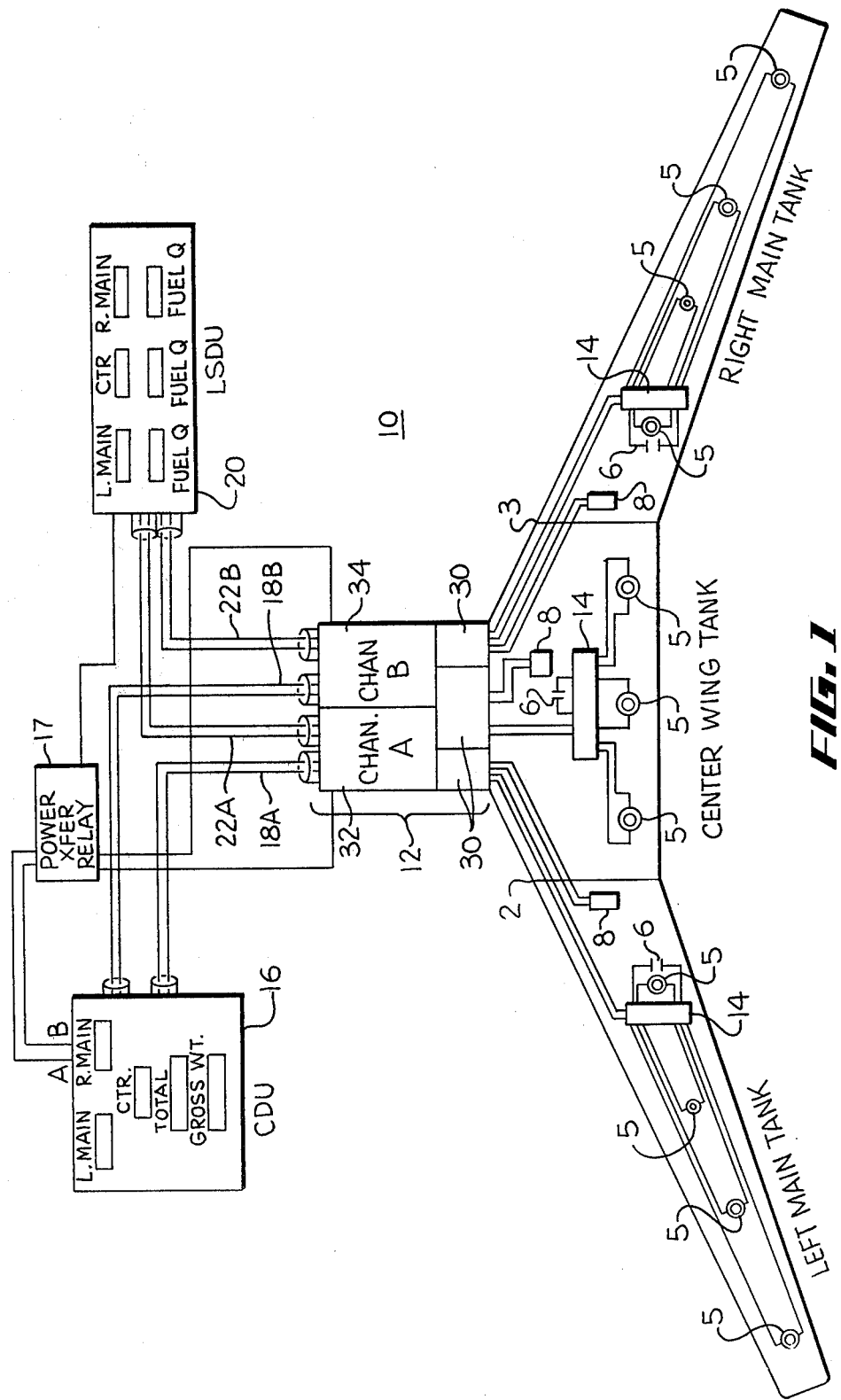
FIG. 1 is a functional block diagram of one particular arrangement in accordance with the invention.
Figure 3:
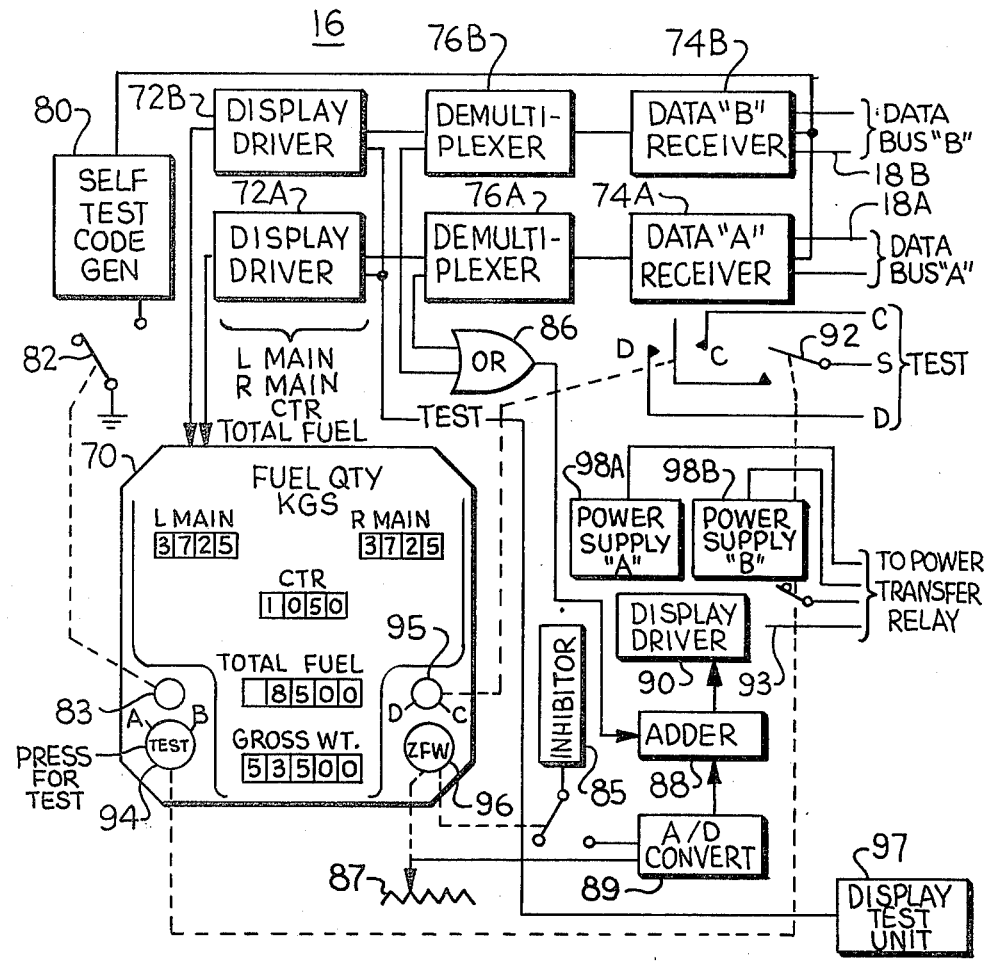
FIG. 3 is a block diagram showing a Cockpit Display Unit (CDU) which may be used in the system of FIG. 1.

The conceptual block diagram of FIG. 1 illustrates a multiplexed fuel gaging system 10 having a standard electronic module 12 coupled to receive fuel tank signals from a plurality of tank junction probes 14 and direct corresponding multiplexed, digitized signals to an associated cockpit display unit 16 and to a related load select/display unit 20 over respective pairs of conductors. Further details of the CDU (Cockpit Display Unit) 16 are illustrated in FIG. 3, shile the LSDU (Load Select/Display Unit) 20 is represented in greater detail in FIG. 4. The system of FIG. 1 is shown as providing fuel gaging for three separate tanks of an aircraft; left main, right main, and center. However, it will be appreciated that additional tanks may be monitored with a suitable number of displays being provided in the respective display units.

A power transfer relay 17 is shown coupled to produce power to the "A" and "B" channels from separate power supplies in the CDU 16 (see FIG. 3) and the LSDU 20 under selective operator control at the CDU 16.

In the diagram of FIG. 1, the aircraft wing is separated by bulkheads 2 and 3 into three distinct tanks. Each of the tanks contains a junction probe 14 to which are connected a plurality of probes or level measuring capacitors 5 dispersed throughout the associated tank. In addition, each tank contains a compensating capacitor 6 connected to its junction probe 14 and a densitometer 8.

The standard electronic module (SEM) 12 is shown in FIG. 1 as being mounted in a central location immediately ahead of the wing and thus adjacent the conductors which lead from the respective fuel tank junction probes 14. The standard electronic module 12 is shown divided into an input portion 30, to which the leads from the junction probes 14 and the densitometer 8 are connected, and dual output portions 32, 34 from which the output leads 18A, 18B and 22A, 22B are taken. Thus, two signal channels are provided between the standard electronic module 12 and the respective CDU 16 and LSDU 20, one comprising the SEM section 32 and conductors 18A and 22A, the other comprising the SEM section 34 and the remaining conductors 18B and 22B. Each set of conductors 18A, 18B, 22A, 22B is a single shielded, twisted pair arranged to carry the signals representing the fuel gaging information in multiplexed digital form, thereby reducing substantially the wiring requirements between the fuel tanks and the tank display units.

STANDARD ELECTRONIC MODULE

Figure 2:
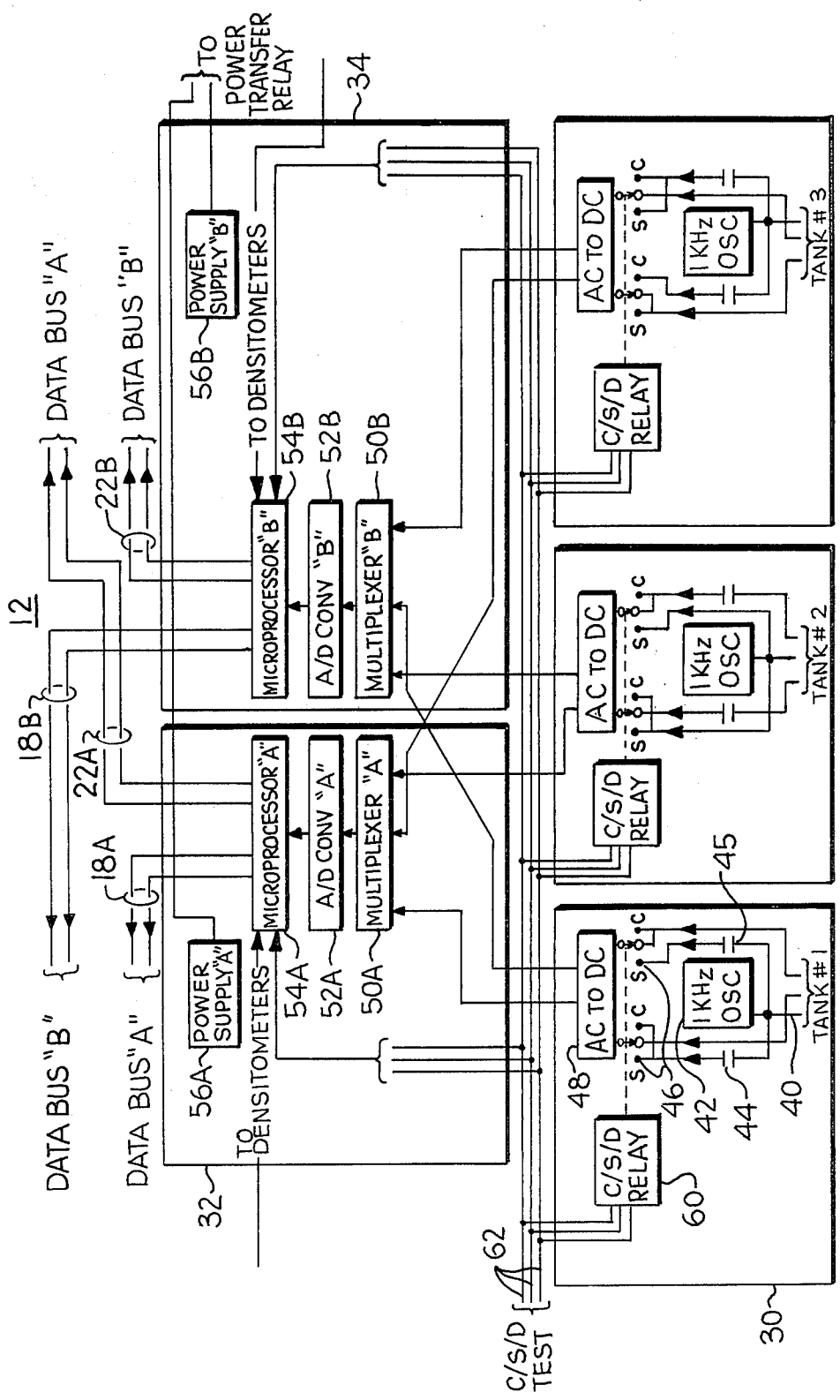
FIG. 2 is a block diagram of the Standard Electronic Module (SEM) portion of the arrangement of FIG. 1.

FIG. 2 shows the standard electronic module 12 having connections 40 leading to the junction probes 14 and compensating capacitors 6 of the respective fuel tanks. Each connection comprises a lead coupled to a drive oscillator 42, operating preferably at 1 kilohertz and producing, preferably, a triangular voltage waveform as described in the above-cited Rubel et al. patents. The circuit also includes a pair of test capacitors 44, 45. Additional leads are connected from the probes through relay switches 46 to a stage 48 for converting the AC signals to proportional DC signals which are then fed to multiplexers 50A and 50B as the initial stages of the dual channel portions of the system. Each of the multiplexers 50A and 50B receives input signals from each of the three AC-to-DC converting stages 48. The "A" channel further includes an A/D (Analog-to-Digital) converter 52A coupled between the output of the multiplexer 50A and the input of a microprocessor 54A to which the data busses 18A and 22A are connected. An identical arrangement of equipment comprising the multiplexer 50B, A/D converter 52B, microprocessor 54B and data busses 18B and 22B is connected in the "B" channel. Separate power supplies 56A and 56B are also provided for the respective "A" and "B" channels. The selection of these power supplies, and with them the associated "A" and "B" circuit blocks, is controlled from the cockpit display unit.

The standard electronic module 12 is further shown as comprising C/S/D (Compensolar/System/Density) relays 60, one for each tank, which are controlled by signal conditions on respective leads 62 connected to switches in the cockpit display unit and the refueling unit and to the microprocessors 54A, 54B to change the condition of the relay switches 46.

COCKPIT DISPLAY UNIT

The cockpit display unit 16 is shown in FIG. 3 as comprising a fuel quantity display unit 70 having provision for readouts of fuel weights in the left main, right main and center tanks, as well as of the total fuel and the gross weight of the aircraft. The displays comprise conventional 7-segment incandescent filament indicators for each digit. Alternatively, liquid crystal displays or other known digital readout devices may be employed. The individual displays of fuel quantity are activated by an associated display driver 72A or 72B (one for each channel) which receives inputs from associated data receivers 74A, 74B after demultiplexing in demultiplexers 76A, 76B provided in the respective channels. A test code generator 80 is connected to an alternate input of the two data receivers 74A, 74B to permit self testing of the displays. The test code generator 80 is activated by a switch 82 controlled by a slotted shaft 83 on the front panel for screw driver manipulation.

Signals from the demultiplexers 76A, 76B are also applied to an OR gate 86 and then to an adder 88. The other input to the adder comes from A/D converter 89 which provides signals for a display driver 90 associated with the gross weight readout. Rotary switch 93 is actuated by A/D Control 94 which controls a power transfer relay 17 (FIG. 1) to select between power supplies 98A and 98B in the CDU and power supplies 56A and 56B in the SEM 12. A/D converter 89 is provided input from potentiometer 87, controlled by control knob 96. Addition in the adder is disabled by inhibitor 85 while setting Zero Fuel Weight (ZFW) (with knob 96 in the "out" position). Additional test circuitry includes a push button switch 92 activated by the Test push button 94 on the front panel and coupled to activate the C/S/D relays in the SEM 12 (FIG. 2).

The testing procedure is like that for the C/S circuitry described in the cited Hersch et al and related patents. When operating the Test switch 94 in the Test position, known capacitors 44 and 45 (FIG. 2) are coupled into the signal circuit in place of the probe capacitors 5 and compensating capacitors 6 in the fuel tanks, and a known density value is substituted for the actual density in the microprocessor so that the indicator reads a preselected value. Activating the switch 92 with the D/C (Density/Compensator) selector switch 95 in the C position substitutes fixed capacitor 44 for the level measuring capacitors 5, and a known density value is substituted for the actual density in the microprocessor, but leaves the compensating capacitors 6 in the circuit. Under these circumstances, the displays provide another preselected readout value if the equipment is operating properly. When activating the switch 92 with the D/C selector switch 95 in the D position, fixed capacitors 44 and 45 (FIG. 2) are substituted for the probe capacitors 5 and compensating capacitor 6 in the fuel tanks, but the actual density is used for deriving the fuel quantity displayed. Test switch 94 also selects between A and B positions for testing the A and B channels independently.

LOAD SELECT/DISPLAY UNIT

Figure 4:
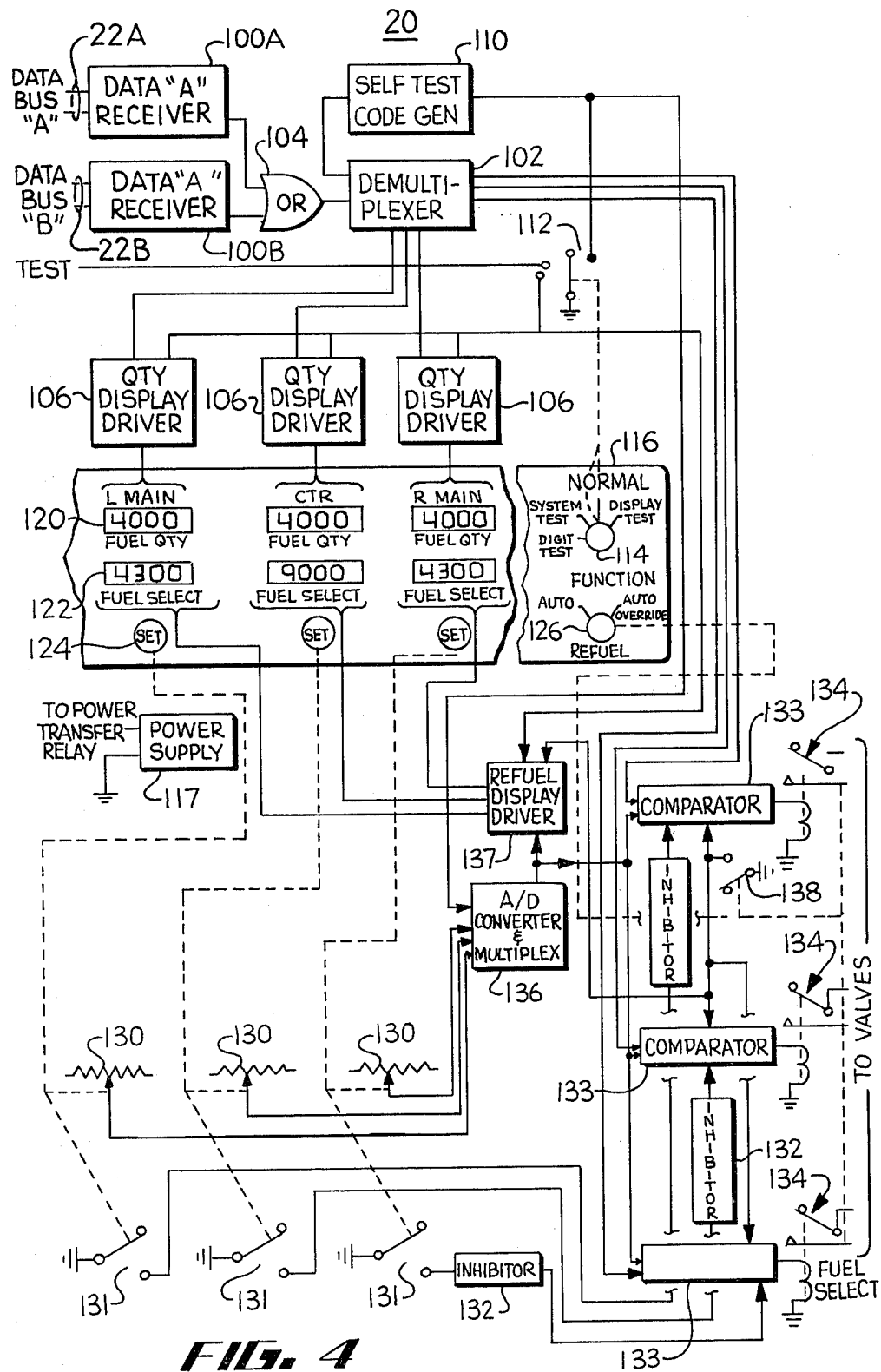
FIG. 4 is a block diagram showing a Load Selector Display Unit (LSDU) which may be used in the system of FIG. 1.

The LSDU unit 20 as shown in FIG. 4 comprises a pair of data receivers 100A and 100B for receiving input multiplexed signals via the respective data busses from the SEM 12 of FIG. 2 and applying the received signals to a demultiplexer 102 through an OR gate 104. The outputs of the demultiplexer 102 are applied to respective display driver stages 106 which serve to generate the digital readouts showing fuel quantity in the individual tanks. The refueling unit 20 also includes a self test code generator 110 connected to be activated by a function switch 112 which is controlled by a function selector knob 114 on the front panel 116. By this means, the circuitry of the gaging system can be tested from the LSDU 20 in a manner similar to that described for the testing for the cockpit display unit 16.

The unit 20 is customarily located at a convenient location on one wing of the aircraft where the indicators are visible to the person in charge of filling the fuel tanks. Each fuel quantity indicator, such as the left main readout 120, is associated with a fuel select indicator 122. The fuel select indicators 122 are manually set by set knobs 124 to the amount of fuel which is to be in the corresponding tank after refueling. These indicators 122 control associated fuel supply valves (not shown) and close the associated valve whenever the reading of the fuel quantity indicator 120 is within a predetermined range of the reading of the fuel select indicator 122. The switch 126 permits the operator to override the automatic shutoff when set in the Auto-Override position.

When the switch 126 is set to Auto-Override, the fuel selector circuit is bypassed and the fuel select indicators 122 are blanked out. Fueling is then controlled by the operator through the Full shut-off switch of the tank.

The circuitry associated with the fuel select indicators 122 and set knobs 124 include setting potentiometers 130 and switches 131, the latter being connected through inhibitors 132 to comparator stages 133 which control the associated fuel valves (not shown) by means of fuel select relays 134. The potentials set in the individual potentiometers 130 are applied to an A/D converter and multiplex stage 136, the output of which is applied to the respective comparators 133 and to a refuel display driver 137 which drives the fuel select displays 122. Fuel quantity signals from the demultiplexer 102 are also applied to the comparators 133 for comparison with the fuel select signals.

Closure of a switch 131 by pulling out the associated knob 124, during setting of the preselect value for the display 122, causes the series inhibitor 132 to disable the associated comparator stage 133. When the display 122 has been set to the preselected fuel quantity, the knob 124 is pushed in, opening the switch 131 and permitting the associated comparator 133 to energize its fuel select relay 134, thus opening the fuel valve controlled by the energized relay. Each relay continues to be energized until the corresponding tank signal from the demultiplexer 102 reaches the quantity set into the associated fuel select display 122 by its potentiometer 130, at which time the comparator 133 de-energizes the fuel select relay 134 so that the fuel to the tank involved is shut off.

For operation in the Auto-Override mode, a switch 138 is closed, which inhibits all comparators 133 and energizes the associated relays 134. This permits fuel to flow into the tanks until the tanks are full. During operation in this mode, the switch 138 also grounds the input to the refuel display driver 137 so that the fuel select displays 122 are blanked. The refuel display driver 137 also serves to activate the fuel select displays 122 in the Display Test function mode.

When the system is controlled from the LSDU 20, power from the transfer relay 17 (FIG. 1) is supplied to a power supply 117.

FUNCTIONAL BLOCK DIAGRAMS

As shown in the block diagrams for the system of FIGS. 1-4, the SEM and associated circuitry are set up to provide signals for three separate tanks. However, the present design of the SEM and the digital transmission circuitry will handle up to six separate fuel tanks.

The three sets of leads 40 from the respective tanks direct analog fuel quantity information signals to conversion and multiplexing stages 48, 50A and 50B (FIG. 2). The multiplexed analog signals are converted to digital signals by their A/D converters 52A, 52B which constitute the beginning of the two separate digital signal processing and transmission channels A and B. The particular channel in use is selected by the power supply select switch 93 in the CDU (FIG. 3) which controls the power transfer relay 17 (FIG. 1). Each of the two channels A and B provides data streams on associated data busses leading to the CDU and the LSDU. Test inputs from either the CDU or the LSDU connect to the analog tank interface modules at the input to the SEM and to each of the microprocessors 54A, 54B (FIG. 2) to permit testing of the system. In one particular embodiment, the capacities of tank No. 1

(left main) and tank No. 3 (right main) are approximately 9450 lbs. (4275 kgs.) while the capacity of tank No. 2 (the center tank) is approximately 21,450 lbs. or 9727 kgs. The SEM/data channels have the capability of accommodating up to six tanks without redesign. The absence of additional tank inputs to the units beyond the three which are shown results in the transmission of an "invalid" code to the display units for such absent inputs.

Each standardized electronics module 12 has a resolution of plus or minus 50 lbs. in the output data for individual tank readings and plus or minus 100 lbs. in the output data for total and fuel readings. The accuracy at room temperature for individual tank data is plus or minus 50 lbs. and for total fuel data is equal to the sum of the individual tank readings plus 0 or minus 50 lbs., due to rounding off.

Data is simultaneously transmitted from the standardized electronics module 12 to the cockpit display unit 16 and the fuel load selector display unit 20 on the pair of data busses of the channel selected by the switch 93, 94. Each transmitted data bit is sent in FSK PDM (frequency shift keyed, pulse duration modulation) format in accordance with the following parameters.

The data is updated by the SEM approximately every 2.0 seconds. Thus, one 2-second data stream comprises a first transmission consisting of 140 bits, followed after 250 milliseconds by a second transmission consisting of 104 bits. Transmission No. 1 consists of eight data words, each consisting of four BCD (binary coded decimal) characters. The eight data words are in the following order: Sync No. 1, total fuel (leading zeros blanked), Tank 1, Tank 2, Tank 3, Tank 4, Tank 5, Tank 6, and total fuel (including leading zeros for use in the CDU to compute gross weight). The Sync No. 1 word is transmitted as 000000000011. Each tank word and the total fuel data words are transmitted in the order from the least significant bit of the least significant digit through the most significant bit of the most significant digit. Each tank data word for which no analog card is provided (Tanks 4, 5 and 6 of the example of FIG. 1) contains four blank characters. Each of the data words for total fuel and Tanks 1 through 6 incorporates leading zero blanking, which is accomplished by transmitting the character Hex F (1111) for all leading zeros.

In transmission No. 2, a Sync No. 2 word, transmitted as 00001011, is followed by six data words for the six individual tanks. The Sync No. 2 word is the only 8-bit word. The tank words are each 16 bits (four BCD characters). No leading zero blanking is employed in tranmission No. 2.

The entire data stream, i.e. both transmissions Nos. 1 and 2, is directed to both the CDU and the LSDU. However, the CDU utilizes only transmission No. 1, which it identifies by the sync word. The LSDU uses transmission No. 1 for providing a readout of fuel quantity and transmission No. 2 for controlling the preselect, automatic shut-off system. Transmission No. 1 is generated by the microprocessor from measurement data. The microprocessor develops transmission No. 2 from transmission No. 1 before sending out the two transmissions. Each tank data group of transmission No. 2 is offset by +50 Kgs. or +100 lbs. from the corresponding data group of transmission No. 1 in order to compensate for the response time of the valves in the automatic shut-off system. Although no leading zero blanking occurs during transmission No. 2, blanking will occur for all four characters of a faulty tank data word.

All data is transmitted as FSK (Frequency Shift Keyed) encoded signals. A logic 1 bit consists of a mark for 600 microseconds followed by a space for 200 microseconds. A logic zero is represented by a mark of 200 microseconds followed by a space of 600 microseconds. In each instance, the bit time is 800 microseconds. Mark time is transmitted at 64 Khz, while space time is transmitted as 48 Khz. The information is transmitted as data words comprising four binary coded decimal (BCD) characters. These characters correspond to the following chart, the bits being shown in the order from the least significant bit to the most significant bit, proceeding from left to right.

TABLE I

| BCD 1 | 1000 |
|---|---|
| BCD 2 | 0100 |
| BCD 3 | 1100 |
| BCD 4 | 0010 |
| BCD 5 | 1010 |
| BCD 6 | 0110 |
| BCD 7 | 1110 |
| BCD 8 | 0001 |
| BCD 9 | 1001 |
| BCD 0 | 0000 |
| Hex F | 1111 |

Hex F is used to signify a blank; thus where leading zero blanking is indicated, Hex F is transmitted for each leading zero. The data for tanks 4, 5 and 6 of a three tank configuration is always blank, transmitted as a tank data word FFFF.

A number of advantages derive from the use of this modulation format. By using frequency shift keying, one avoids the sudden transitions encountered when transmitting pulses. Thus, electromagnetic filters can be used to minimize electromagnetic interference and the signals can be transmitted in a balanced configuration through transformer coupling. The balanced signals are sent over twisted wire pairs, each pair having a surrounding electrostatic shield braid. This braid is preferably grounded at multiple points to minimize electromagnetic interference. The multiple point grounding is made feasible by use of the balanced signal transmission over the twisted pair. FSK PDM allows use of AC transformer coupled signals (data inputs and outputs) which in turn allows for multiple grounding of the shields for lightning protection. Furthermore, since pulse width modulation is employed, no synchronizing clock is required.

In the operation of the standardized electronics module, the analog multiplexer, the A/D converter, and the microprocessor are self-checked each cycle. If a failure is detected, all of the individual tank dislays and the total fuel display at the cockpit display unit and load selector display unit will be blanked as a result of transmitting invalid BCD codes (1111). Also, the detection of a failure in any one of the tank circuits (corresponding to a reading in excess of the quantity limit for a given tank) will result in blanking out the corresponding tank displays, again by transmitting an invalid BDC code 1111. In such a case, the totalizer reads the sum of the remaining tanks. Where a failure in either of the dual channels is detected, the operator can then switch channels to eliminate a possible source of error by activating the power transfer switch 93 in the CDU. The operator can also activate the test switch which results in a display of 3000 plus or minus 50 lbs. (or 1500 plus or minus 25 Kgs.) at the cockpit display unit.

Each of the two channels in the cockpit display unit consists of a power supply and the digital circuitry to process the serial digital data sent by the standard electronics module and steer the data to the appropriate displays for each updata cycle. The front panel of the cockpit display unit includes the selector knob 94 controlling switch 93 for selection of one of the two independent channels (A or B) of the entire fuel gage system (CDU, SEM and LSDU, although in the LSDU the input circuit is redundant). The same selector switch provides the capability of system testing the activated channel by depressing the selector knob 94. In the test position, all of the tank and totalizer dislays should read the number indicated above (3000 plus or minus 50 lbs. or 1500 plus or minus 25 kgs.). The totalizer will read the sum of the tank displays to +0/−50 lbs. or +0/−25 kgs.

Additional built-in test equipment for fault isolation permits checking of the system from the cockpit display unit through two spring-loaded switches which are flush-mounted with the face of the instrument and are accessible through screwdriver slots. The D/C (Densitometer/Compensator) switch 95 (FIG. 3) activates the standardized electronics module to check the system with the actual density input in the system check loop and with the tank compensator in the system check loop. The CD (Cockpit Display) switch 83 provides the capability of checking the activated channel of the cockpit display unit without the aid of SEM circuitry or interwiring. A zero fuel weight knob 96 is provided next to the gross weight readout and, when depressed, permits the pilot to set in the Zero Fuel Weight (ZFW) of the aircraft.

The LSDU contains a single channel of power supply and digital circuitry for processing serial digital data sent by the SEM. As shown in FIG. 4, this channel comprises the power supply 117, the OR gate 104, demultiplexer 102 and quantity display drivers 106, together with appropraite data storage circuitry for processing data from the SEM over either channel A or B and steering it to the individual tank displays 120 for each updata cycle. The channel also contains appropriate control electronics coupled to the individual tank displays 120. Dual channel redundancy is not considered necessary within the LSDU because this unit is only used when the aircraft is on the ground. However, the LSDU does include certain test capabilities as indicated in FIG. 4 and described above. The function selector switch 114 provides for fault isolation and includes a System Test position for checking the tank displays in conjunction with the SEM, as a system. A Display Test position allows an individual check of the LSDU itself. A Digit Test position allows for an independent check of the 7-segment fuel quantity and fuel select displays by energizing each of them independently of the rest of the LSDU.

The fuel load selector circuits have two modes of operation, Auto (automatic) and Auto-Override. In the Auto-Override mode the fuel selector circuit is by-passed, and the fuel select displays 122 are blanked out (de-energized). In this mode, fueling is controlled by the tank's Full shut-off switch to prevent tank overfill.

It will be understood that the tanks can be filled in a manual mode, in which power is removed from the LSDU and the Fuel Shut-off switch. The fill valves are operated manually.

In the Auto mode, fuel select data is set in by the operator via switches 124 to indicate the quantity of fuel to be placed in each tank. This data is applied to a comparator electonics stage and to the fuel select display 122. The comparator electronics is coupled to the fuel-select relays as described above. These relays control valves for shutting off the fueling lines when the preselected quantity is reached. The update cycle for the LSDU is approximately 2 seconds for all displays during normal operation. The preselected fuel displays update in less than 0.3 seconds while presetting to facilitate the setting. The display readouts for fuel quantity and fuel select are in increments of 50 lbs. or 25 kgs.

It is, of course, extremely important to provide accurate indications of fuel quantity. The accuracy of the measurement within the individual tanks is improved by the addition of the densitometer as described above to the previously known capacitance probe system. However, these measurements must be transmitted to the cockpit and load select display units without failure or error. The reliability of the system in this regard is materially improved by providing dual channel redundancy from the SEM to the display units and throughout the cockpit display unit. Moreover, the information must be displayed to the operator in a manner which avoids confusion and provides a clear indication of the quantity measurements. Furthermore, it is desirable to detect automatically faults which may occur in the system and to provide a corresponding indication to the operator so that steps may be taken to change channels to avoid a fault or at least to refrain from relying on a reading which is known to be in error. Finally, it is desirable to provide the capability of conducting certain tests of this system from an operator position so that errors may be discovered and taken into account.

As discussed above, fault detection is developed by limiting certain display quantities, providing a comparison of measurement readings with the allowed quantities, and using the presence of a non-allowed quantity as an indication of a fault. In similar fashion, where the system has the capability of providing information for more tanks than are actually installed, the transmission of data for such vacant tank positions, other than a predetermined code for such positions, is also taken as a fault indication. For clarity of display and interpretation by the operator, leading zeros are blanked for certain selected displays. Thus for example when the quantity of fuel in a given tank is low so that the display goes from 1000 lbs. to 975 lbs. the thousands digit is blanked in order to make it more apparent to the operator that the aircraft is low on fuel. In the operator test mode, preselected digit values are displayed to provide an indication to the operator of the presence or absence of a fault.

In transmission No. 1, certain displays are limited to certain allowable digits in accordance with the following chart (Table II), for the current DC-9-80 3-tank kgs. version, which indicates the correspondence between transmitted data and displayed fuel quantities, proceeding from the most significant (MSD) on the left to the least significant digit (LSD) on the right. The quantities displayed on the CDU is comprised of the active digits transmitted from the SEM, plus a suitable number of "fixed zeroes" generated within the CDU. Table II indicates the allowable digits for the kgs. version.

TABLE II (Kgs.)

|  | Leading Zero Blanking | | No Leading Zero Blanking | | Fixed Zeroes |
| --- | --- | --- | --- | --- | --- |
|  | MSD | LSD + 2 | LSD + 1 | LSD |  |
| Individual Tank-Allowable Nos. | 0-9 | 0.9 | 0,2,5,7* | 0,5* | — |
| -Value (weight) | ×1000 | ×100 | ×10 | ×1 | — |
| Total Fuel-Allowable Nos. | 0,1,2 | 0-9 | 0-9 | 0,5 | 0 |
| -Value (weight) | ×10,000 | ×1000 | ×100 | ×10 | ×1 |
| Gross Wt.-Allowable Nos. | 0,1,2 | 0-9 | 0-9 | 0,5 | 0 |
| -Value (weight) | ×10,000 | ×1000 | ×100 | ×10 | ×1 |

*The LSD + 1 and LSD digits are restricted to the combinations: 00, 25, 50 and 75.

The above correspondence is determined by the PROM in the microprocessor circuit and may vary with different aircraft applications. A corresponding table applies for the lbs. version. However, in that version the first digit of the total fuel display is always blank (transmitted as Hex F) whereas the first transmitted digit in the gross weight display is always zero.

The displays at the CDU and LSDU follow the same general format, except that certain of the displays will have different multipliers for the digits with one or more numbers of fixed zeroes following the displayed value. For example, in the lbs. version the gross weight is displayed in six digits, reading in hundreds of thousands of lbs. The last two digits in the display are fixed zeroes, not transmitted by the SEM but generated in the CDU.

The Zero Fuel Weight control (knob 96 in FIG. 3) is used by the operator to set the zero fuel weight (weight of the aircraft dry). This control covers the range (in the lbs. version of the particular embodiment described herein) of 50,000 to 135,000 lbs. The display automatically adds the total fuel weight to the zero fuel weight to develop the gross weight reading.

In transmission No. 2, the digits are limited in accordance with the following Table III:

TABLE III (Kgs.)

|  | MSD | LSD + 2 | LSD + 1 | LSD |
| --- | --- | --- | --- | --- |
| Individual Tank-Allowable Nos. | 0-9 | 0-9 | 0,2,5,7* | 0,5* |
| -Value (weight) | ×100 | ×100 | ×10 | ×1 |

*The LSD + 1 and LSD digits are restricted to the combinations: 00, 25, 50 and 75.

A corresponding table applies for the lbs. version. The numerical value of the individual tank data sent in transmission No. 2 is offset by +50 kgs. with respect to the actual fuel quantity to compensate for the response time of the fuel shut-off valves. Invalid data is blanked by transmitting the blank character (Hex F) for all four characters per word, thereby shutting off any open-fill values in the Auto mode to preclude overfilling due to invalid data.

The maximum allowable tank displays of this specific embodiment are as shown in Table IV. Display blanking occurs at 50 lbs. (25 kgs.) above the numbers shown:

TABLE IV

| Tank | Lbs. Version | | Kgs. Version | |
| --- | --- | --- | --- | --- |
|  | Active Digits | Fixed Zeroes | Overflow | Active Digit |
| L. Main | 1095 | 0 Lbs. |  | 4675 Kg. |
| R. Main | 1095 | 0 Lbs. |  | 4675 Kg. |
| Ctr. | 2295 | 0 Lbs. |  | 1075 Kg. |
| Aux. | 1095 | 0 Lbs. |  | 4675 Kg. |
| Fwd. | 1095 | 0 Lbs. |  | 4675 Kg. |
| Aft. | 1095 | 0 Lbs. |  | 4675 Kg. |

"Overflow" means the highest reading the unit will display. Blanks signify overflow. The Auxiliary, Forward and Aft tanks are included within the system design but are not used in the 3-tank version.

The SEM incorporates self-check capability for checking the A/D converter 52, the digital multiplexer 50 and the microprocessor 54 of the particular channel (A or B) which is in use in each cycle. Detection of a failure in one or more of the tank circuits by exceeding the limits of Table IV will result in blanking the corresponding tank display through the transmission of an invalid BCD code (Hex F.) The totalizer in the CDU reads the sum of the remaining tanks, in such an event. If the SEM detects a failure in a common digital circuit, all of the individual tank displays and the total fuel display are blanked by transmitting the blanking code. In such event, the gross weight indication then displays only the preset zero fuel weight, by zeroing the gross weight data transmitted from the SEM, sent as four BCD zero characters.

Activation of the D/C and system test function causes the following displays in all display units at the CDU and the LSDU for the specific embodiment herein described.

TABLE V

|  | Lbs. Version | Kg. Version |
| --- | --- | --- |
| System Test | 3000 +/− 50 lbs. | 1500 +/− 25 kgs. |
| D | 3000 +/− 50 lbs. | 1500 +/− 25 kgs. |
| C (bench test- | 3000 +/− 50 lbs. | 1500 +/− 25 kgs. |

TABLE V-continued

| Lbs. Version | Kg. Version |
|---|---|
| wet comp. used) | |

The SEM further incorporates the capability of detecting a missing tank unit in a particular tank. In such an event, the SEM transmits four BCD "9's" for that particular tank. The corresponding display unit in the CDU and LSDU reads 9999 for the kgs. version and 9990 for the lbs. version. The totalizer and gross weight display data do not, however, include these 9's for the tank indicating the missing tank function. The missing tank activation point is with a dry compensator and with the tank unit capacitance value selected to be half the value of the smallest probe (13 plus or minus 3 pF for the particular embodiment described) below empty. The SEM also incorporates the capability of detecting a malfunction in the densitometer circuit in a particular tank. In such event, the least significant active digit is blanked out on the CDU and LSDU displays, identifying a fault in the densitometer circuit.

Figure 5:
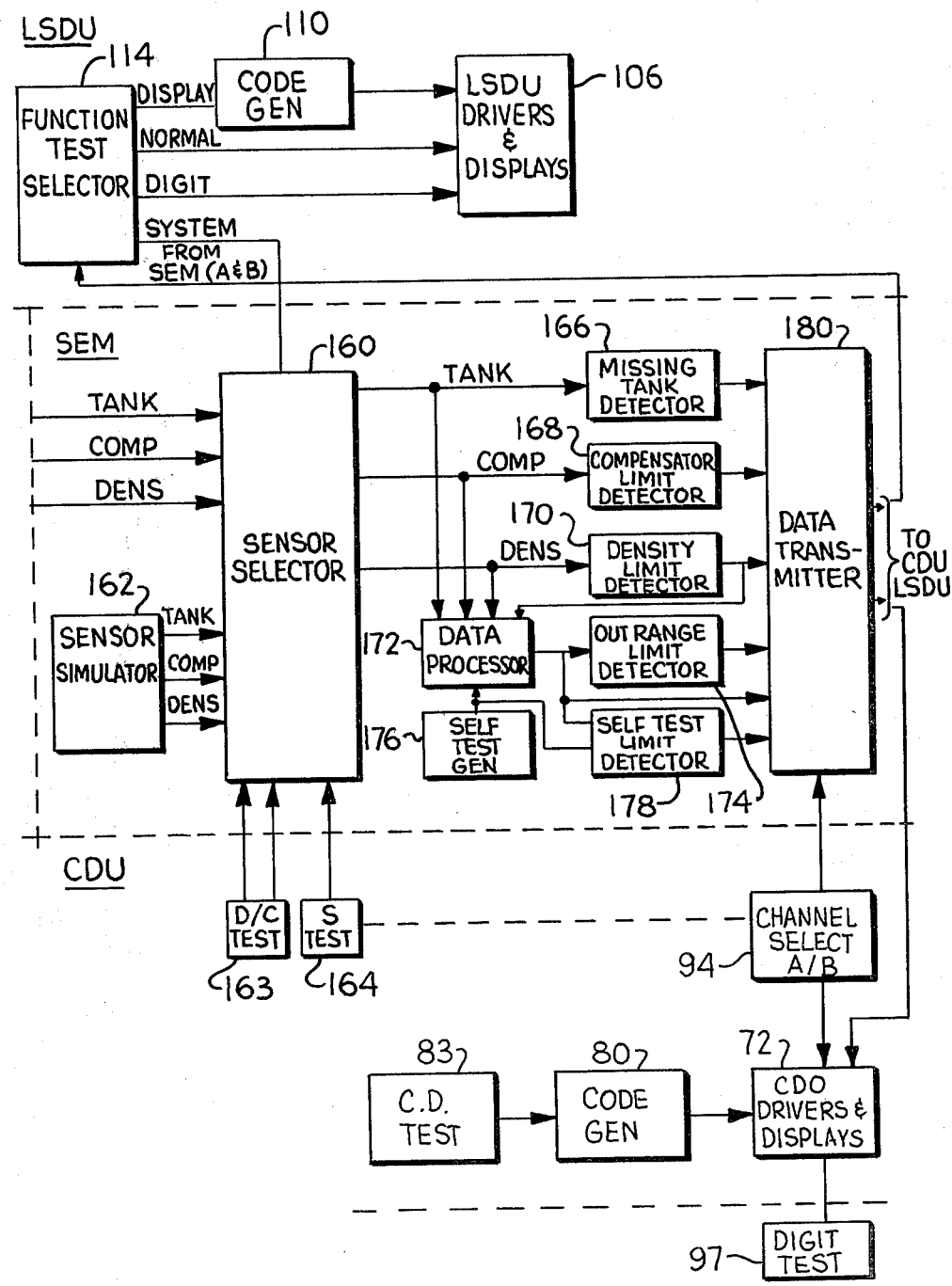
FIG. 5 is a functional block diagram showing the testing and fault detecting and indicating features of the system.

FIG. 5 is a functional block diagram illustrating particular aspects of the fuel gaging system for self testing various portions of the system and providing an indication of detected faults to an operator. It shows the control functions of the CDU and LSDU related to a portion of the SEM representing one of the dual channels for processing tank signals and detecting and generating indications of fault signals. As indicated in FIG. 5, signals from each tank circuit, compensator circuit, and densitometer are applied to a sensor selector 160 along with simulated tank, compensator, and densitometer signals from a sensor simulator 162. These signals from the sensor simulator simulate precision standard signals of a selected quantity of fuel and with a selected density. The sensor selector 160 will select various combinations of actual and simulated inputs, depending on the state of the C, S and D test signals controlled from the CDU, as shown in Table IV below:

TABLE VI

| Test | Data Processor Input Provided From | | | |
|---|---|---|---|---|
| | Tank Unit | Compensator | Densitometer | Function |
| S | Simulated | Simulated | Simulated | System Test |
| C | Simulated | Aircraft | Simulated | Compensator Test |
| D | Simulated | Simulated | Aircraft | Densitometer Test |

By appropriate examination of the results of the S, C, and D tests, a malfunctioning tank located component can be fault isolated to either the tank circuit, compensator circuit or densitometer assembly for each of the fuel tanks.

The tank signal selected by the sensor selector 160 is applied to a missing tank detector circuit 166 which detects the absence of one or more tank unit sensors not electrically connected to the tank circuit. One purpose of this test is to detect faulty wiring or a faulty tank unit sensor on new aircraft prior to initial fueling. It can also detect the absence of a complete set of tank units in flight. The missing tank detector 166 has a minimum threshold value, and the circuit is set to detect the absence of a value to one-half the value of the smallest tank unit sensor on a completely dry tank with a dry compensating capacitor. In the event of failure detection, a fault signal is applied to the data transmitter 180, causing the affected tank to display the 999 fault indication on the CDU and LSDU.

The compensator signal selected by the sensor selector 160 is applied to a compensator limit detector 168. The compensator limit detector 168 detects an open circuit on the compensator signal line due to either faulty wiring or a faulty compensator, and also detects a shorted compensator. The compensator limit detector 168 operates to discriminate between acceptable signal levels within a selected range which includes valid signals for wet or dry conditions but excludes out-of-range signals for open and shorted conditions. In the event of a failure detection, a fault signal is applied to the data transmitter 180, causing the affected tank to also display the 999 fault indication on the CDU and LSDU. Thus the 999 fault indication is used to identify tank circuit and compensator fuel tank located faults.

The density signal selected by the sensor selector 160 is applied to a density limit detector 170. The density limit detector 170 detects an out-of-bounds condition for the measured density. These limits are selected for normal density limits for various types of fuel. If a fault is detected by the density limit detector 170, a fault signal is applied to the data transmitter 180, causing the affected tank to have the Least Significant Digit (LSD) disabled (blanked) on the CDU and LSDU. Thus a blanked LSD fault indication is used to identify densitometer-related faults in the fuel tanks.

The selected tank, compensator and density signals are also applied to the data processor 172 which calculates the mass of fuel in each of the tanks. This calculated quantity is based upon the tank, compensator, and density inputs for each tank, taking density correction into consideration. In the event of a fault being detected by the density limit detector 170, the fault signal is also applied to the data processor 172, thereby disabling the density correction function. Thus the calculated fuel quantity data only includes density correction when the density signal for that tank is valid. The data processor output is applied to the data transmitter 180 for transmission to the CDU and LSDU. The data processor output is also applied to an overrange limit detector 174 which identifies fuel quantity tank signals that are out of range for that capacity tank. Such a fault indication would normally be due to the electronics in the data processor failing in the positive direction, thereby causing an excessively high upscale reading. A fault signal from the overrange limit detector 174 is applied to the data transmitter 180, thereby causing the affected tank to show the completely blanked display fault indication on the CDU and LSDU. It should be noted that a blanked display or digit is accomplished by transmitting an invalid BCD code (1111). In addition, if any tank indicates either the 999 fault indication or the blanked tank indication, the totalizer reads the sum of the remaining tanks.

A self test generator 176 automatically applies a self test signal once each data frame (approximately every 2.0 seconds) to the analog multiplexer 50, A/D converter 52, and the microprocessor 54 (FIG. 2) of each of the dual processing channels. The results of this self test signal being applied to the data processor 172 is examined by the self test limit detector 178. If an out-of-tolerance condition is detected as a result of a malfunction in the data processor 172 common circuitry, a fault signal is applied to the data transmitter 180. This fault signal will disable all of the individual tank displays and the total fuel quantity display on the CDU and LSDU. The gross weight indication shall then display only the present Zero Fuel Weight (ZFW) by zeroing the total fuel data sent to the gross weight display in the CDU.

The CDU portion of FIG. 5 includes D/C and S test stages 163, and 164. These tests, when activated, cause the sensor selector 160 in the SEM to check the system with and without the tank compensator, and with and without the density signal in the system check loop.

A channel select/test stage 94 permits the pilot to select either the A or B channel from the SEM and to test that channel via the data transmitter 180 in the SEM. A CD test stage 83 provides the cability of checking the activated channel of the CDU independent of SEM circuitry or interwiring. This is accomplished by activating a self-contained code generator 80 which causes the drivers 72 to activate the cockpit displays. In addition, an external digit test signal from display test unit 97 will drive all CDU display digits to display 8's (all filaments "on").

The LSDU test system, shown in FIG. 5, incorporates a test selector switch 114 having four different positions. In the display test position, similar to the CD test of the CDU, the test selector 114 activates a self-contained code generator 110 which activates the LSDU display drivers 106 and 137 to illuminate the predetermined test number. In the normal position, the signals from the SEM, over either channel A or channel B, are applied by the test selector LSDU displays 106. In the system test position, sensor selector 160 in the SEM is activated to test all tank circuits and densitometer inputs. In the digit test position, the test selector activates the LSDU displays, both fuel quantity 120 and fuel select 122, to display all 8's.

Activation of the system test from either the CDU or LSDU causes all display units to show a predetermined quantity. The totalizer and gross weight displays register accordingly. However, detection of a failure in one or more of the tank circuits, as by exceeding the maximum allowable values of Table IV above, will result in blanking out the corresponding tank displays, through the transmission of an invalid BCD code (1111). The totalizer reads the sum of the remaining tanks.

If the SEM detects a failure in common digital circuitry (for example, during self testing), all of the individual tank displays and the total fuel display are blanked by transmitting invalid BCD codes. The gross weight indication then displays only the present zero fuel weight, by zeroing (disabling) the total fuel data transmitted by the SEM for the gross weight display in the CDU.

In the event of a missing tank unit detection or faulty compensator, the SEM transmits BCD "9s" (i.e. all active digits go to 9) for the particular tank. This results in displaying all 9s for the kgs. version and all 9s except the least significant digit for the lbs. version. In this case, the totalizer and gross weight display data do not add in the 9s for the tank indicating the missing tank function.

When all 9s are displayed in a given tank display, the pilot then operates on the fuel quantity readings of the remaining displays plus his calculation of fuel quantity from the last valid indication of the now missing tank. In the event of blanking, indicating a failure in common equipment, the pilot can switch channels to transfer to a presumably good channel. The combination of fault detection through the various comparisons and tests performed automatically by the SEM, plus the provision for recognizing the occurrence of certain excluded quantities as a fault, together with the indicating of faults at the operator panels in the CDU and the LSDU, provide improved reliability in fuel gaging systems in accordance with the present invention. The ability of the operators to conduct testing of the system from the operator panels and the capability provided the pilot of switching to an alternative data channel in the event of an indication of failure in the channel then being used further increase the reliability and effectiveness of the system.

Although there have been described above specific arrangements of a multiplexed gage system in accordance with the invention for the purpose of illustrating the manner in which the invention may be used to advantage, it will be appreciated that the invention is not limited thereto. Accordingly, any and all modifications variations or equivalent arrangements which may occur to those skilled in the art should be considered to be within the scope of the invention as defined in the annexed claims.

What is claimed is:

1. A multiplexed true mass gaging system for aircraft with multiple fuel tanks comprising:
    a plurality of tank probes situated in respective individual tanks for measuring the level of fuel therein;
    a plurality of compensating capacitors, one in each tank, for developing signals proportional to fuel density;
    a plurality of densitometers, one in each tank, for measuring the density of fuel therein, the signals from the tank probes, compensating capacitors and densitometers being combined to provide indications of the true mass of the fuel contained in an individual tank;
    a cockpit display unit mounted in the aircraft cockpit and a load selector display unit mounted at a refueling station, each display unit including digital displays for providing indications of fuel quantity to an operator;
    a standard electronic module mounted adjacent at least one of the tanks for converting analog signals corresponding to fuel level measurement data into serial digital data signals;
    at least one signal channel including of a pair of shielded, twisted leads extending from the standard electronic module to each of the display units;
    means for applying the serial digital data signals to said channel; and
    means at each of the displays for receiving the digital data signals from said channel and utilizing them to energize the digital displays in accordance with the digital data signals.

2. The system of claim 1 further including means in the standard electronic module for detecting errors in the measurement of fuel mass and for generating signals for transmission over said channel indicative of a detected error.

3. The system of claim 2 wherein the error detecting means includes means for limiting valid measurements to a selected range of quantities, means for comparing measurement data signals with said quantities, and means for providing a fault indication upon detecting invalid measurement data signals occuring outside said range.

4. The system of claim 3 further including means for transmitting fault detection signals to provide different display indications uniquely identifying the type of fault detected.

5. The system of claim 4 including means for transmitting signals to develop a display of all 9s upon detection of a fault indicating a missing tank probe.

6. The system of claim 4 including means for transmitting signals to develop a display of all 9s upon detection of a fault indicating a missing tank compensating capacitor.

7. The system of claim 4 including means for transmitting signals to develop a display with a blanked least significant active digit upon detection of a fault in the tank densitometer reading.

8. The system of claim 4 further including at least one additional channel for transmission of digital signals between the standard electronic module and the display units, only one of the channels being utilized at any one time to transmit signals.

9. The system of claim 8 further including self test means in the standard electronic module for testing selected portions of the signal channel in use during each cycle of digital signal transmission.

10. The system of claim 6 wherein the cockpit display unit includes channel selecting means for permitting an operator to select either one of the channels for the transmission of digital signals.

11. The system of claim 10 wherein the cockpit display unit includes means for permitting an operator to test the selected channel.

12. The system of claim 10 further including means for transmitting signals over the selected channel to blank selected displays in the display units upon detection of a fault in circuitry incorporated in the selected channel.

13. The system of claim 1 further including means for detecting leading zeroes in the fuel mass measurement data and generating digital signals to cause blanking of corresponding digits in the fuel quantity displays of the display units.

14. The system of claim 1 wherein the digital signal applying means includes means for transmitting said signals as pulse duration modulated, frequency shift keyed transmissions.

15. The system of claim 14 characterized by shifting between first and second selected frequencies to transmit respective binary digits, each said transmission comprising a portion at a first selected frequency combined with a portion at a second selected frequency.

16. The system of claim 15 wherein a first binary digit is represented by transmission of a first selected frequency for a first time interval, followed by transmission of a second selected frequency for a second time interval, the first time interval being substantially longer than the second.

17. The system of claim 16 wherein the other of the transmitted binary digits is represented by transmission at the first selected frequency for a third time interval, followed by transmission of the second selected frequency for a fourth time interval, the fourth time interval being substantially longer than the third time interval.

18. The system of claim 17 wherein the longer of the time intervals for each binary digit is a multiple of the shorter of the time intervals for that digit.

19. The system of claim 18 wherein the first and fourth time intervals are equal, and wherein the second and third time intervals are equal.

20. The system of claim 1 wherein the means for applying the digital signals comprises means for transmitting the signals in repetitive cycles, each cycle including two distinct transmissions of binary coded decimal words bearing information to control the displays and an associated refueling shut-off valve, wherein the first of the two transmissions controls the displays and the second controls the valve.

21. The system of claim 20 wherein the first of said transmissions incorporates leading zero blanking.

22. The system of claim 21 wherein the second of said transmissions is derived from the information of the first transmission but does not including leading zero blanking.

23. The system of claim 20 wherein each of the two transmissions begins with a unique synchronizing word.

24. The system of claim 20 wherein each transmission comprises a plurality of data words corresponding to fuel mass information for each of the aircraft tanks.

25. The system of claim 24 wherein the first transmission further includes data words conveying measurement information for total fuel both with and without leading zero blanking, the former being used for display of total fuel quantity while the latter is used to develop a display of aircraft gross weight.

26. The system of claim 22 wherein the second transmission contains data words for individual tank fuel mass information offset by a predetermined amount from the information conveyed in the first transmission.

27. The system of claim 26 wherein the degree of offset in said second transmission is selected to compensate for the response time of associated refueling shutoff valves in the aircraft.

28. The system of claim 1 further including testing means at each of the display units for permitting an operator to test selected portions of the system.

29. The system of claim 28 wherein the standard electronic module includes means for testing the tank probes, the compensating capacitors and the densitometers, and wherein each of the display units includes operator controlled means for activating said tank testing means.

30. The system of claim 28 wherein each of the display units includes operator controlled means for initiating testing of equipment within the corresponding display unit.

31. The system of claim 30 wherein each of said operator controlled means includes means for separately testing the displays.

32. The system of claim 30 further including an operator activated code generator within each of the display units for testing portions of the system within that display unit.

33. The system of claim 1 further including signal multiplexing means positioned within the standard electronic module for receiving signals from the individual tanks and multiplexing those signals in serial form for application to said signal channel.

34. The system of claim 1 wherein the standard electronic module includes means for testing and receiving signals from the respective tank probes, compensating capacitors and densitometers, said means including common circuitry usable with a plurality of tanks of different capacitites and selected components coupled to said circuitry for tailoring the common circuitry to a tank of a given capacity.

* * * * *